INVENTORS
MEIR M. LEHMAN
JACK L. ROSENFELD
HANS P. SCHLAEPPI
BY Isidore Match
ATTORNEY United States Patent Office 3,551,894

Patented Dec. 29, 1970

3,551,894

SERIAL CROSS-BAR BUSSING SYSTEM

Meir M. Lehman, Bronx, Jack L. Rosenfeld, Tarrytown, and Hans P. Schlaeppi, Chappaqua, N.Y., assignors to International Business Machines Corporation, Armonk, N.Y., a corporation of New York Filed Dec. 28, 1967, Ser. No. 694,216
Int. Cl. G06f 3/00
U.S. Cl. 340—172.5 7 Claims

ABSTRACT OF THE DISCLOSURE

A bussing arrangement adaptable for use in a multiprocessor system wherein there is provided a separate bus for each of a number of processors or requestors, the busses respectively connecting the processors to the selection circuit of each of a number of memory modules or responders. Addresses, operation commands, and data words are all transmitted serially byte-by-byte over these busses. In the operation of the arrangement, a byte-string which specifies the address of a memory word to be read out or written in, as well as the memory operation which is requested, is repetitively and continually presented on a bus interconnecting a requestor and a responder concurrently with a request for service signal. Consequently, as soon as the responder such as a memory module makes the decision to accept a request, it concurrently commences to accept the address information. After the complete address is assembled, a responder control immediately transmits an acceptance signal to the requestor. Upon the reception of the acceptance signal, the requestor transmits a byte-string representing the data word, sending such word only once. The propagation delays of the acceptance signal and of the data byte-string can be overlapped with other responder operation events whereby only the request signal, the address byte-string and the data string contribute propagation delay to the total effective responder access time as far as the requestor is concerned.

BACKGROUND OF THE INVENTION

This invention relates to a communication arrangement connecting a subset of devices, such as requestors, that require service from and communication with a second subset of devices, such as responders. It is applied advantageously to a bussing arrangement for multiprocessor systems comprising relatively large numbers of processors, channels and memory modules. The bussing system preferably comprises a direct connection between each requestor and each responder; alternatively, it may consist of any other switching network, such as a crossbar switch or a trunking switch.

In relatively large processing systems such as multiprocessor systems comprising a relatively large number of processors, channels, other active entities, and memory modules, the number of paths linking all of the processors, chanels, etc., with all of the memory units becomes very large, and the transmission delays over these paths may vary from negligible to appreciable fractions of the memory cycle times.

Accordingly, it is an important object of this invention to provide a bussing arrangement that operates asynchronously and is, therefore, logically independent of transmission delays.

It is another object of this invention to provide a bussing arrangement in accordance with the preceding object wherein there is provided serial byte-by-byte transmission whereby the cost of the communication network is materially reduced.

In known asynchronous communication over long lines, the propagation delays entailed in the transmitting, for example, of a service-request signal, in the receiving of an acceptance signal in response thereto, in the transmitting of the information proper and in release, tend to consume the major share of the overall transmission time for short messages.

It is, therefore, a further object of this invention to provide a bussing arrangement wherein the aforementioned time delay is minimized, such minimization being effected by the overlapping of substantial portions of the propagation times of the various signals exchanged between a requestor and a responder with considerable parts of the operating cycle of a responder, such as a memory module.

It is a still further object of the invention to provide a bussing system whereby communication delays are minimized, such minimization being effected by the overlapping of part of the delay due to serialization of transmission with the memory cycle.

SUMMARY OF THE INVENTION

In accordance with the invention, there is provided a bussing arrangement for a processing system which includes a plurality of information requestors and a plurality of information responders. The arrangement comprises a plurality of first means interconnecting each of the requestors with each of the responders. Each of the first means includes request line means from a requestor to each of the responders for signifying request for service from one of the responders respectively, start address lines means from a requestor to each of the responders for indicating the first in a string of address bytes, data line means from a requestor to each of the responders for transmitting bytes of information, and start data line means from a requestor to each of the responders for indicating the first byte in a data byte string. The arrangement also comprises a plurality of second means terminating at each of the requestors. Each of the second means includes start line means to a requestor from each of the responders which indicates the first byte in an information byte string, a data line means to a requestor from each of the responders for carrying bytes of information, and request acceptance line means to a requestor from each of the responders for signalling a requestor that its request for service has been accepted. Provided within each of the requestors are first control means for causing the continuous and repetitive presenting of a string of address bytes and the request for service signal on the first means. In each of the responders there are provided second control means for causing the responders to respectively decide to accept the string of address bytes and to assemble the address bytes into an address, the start address line means indicating the first signal in the address, and means for causing the responders to send acceptance signals to the requestors which, in response to the receipt of an acceptance signal, causes the transmitting only once of a string of data bytes to the responders.

DESCRIPTION OF A PREFERRED EMBODIMENT

Figure 1:
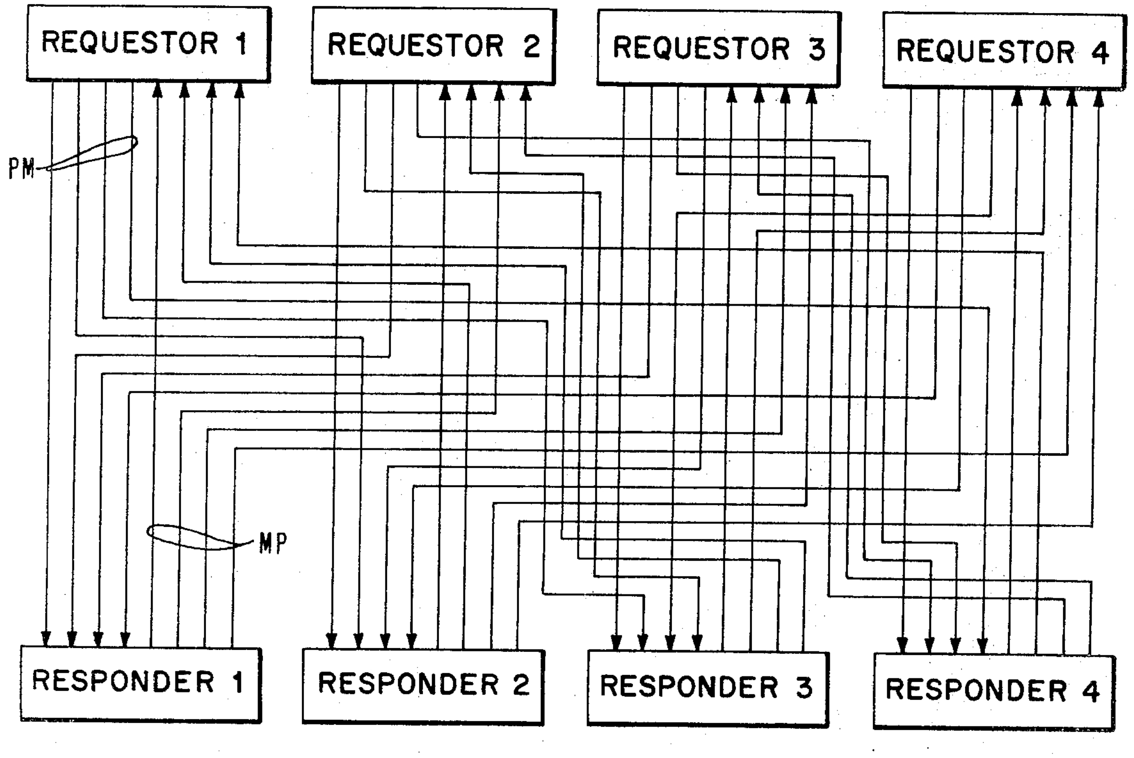
FIG. 1 is a diagram in which there is conceptually depicted the communication paths, according to the invention, in a processing system between a first plurality of requestors and a second plurality of responders.

In the arrangement according to the invention, there is provided a separate bus for each of $p$ processors or requestors respectively, such separate bus connecting its associated processor to the selection circuits of every one of the $m$ memory modules or responders. Addresses, functions such as operation-commands, and data-words are all transmitted serially byte-by-byte over these busses. Thus, in a typical processor/memory operation, the byte-string specifying the address of a memory word to be read out or written into memory, as well as a requested memory operation, is presented repetitively and continually on the interconnecting bus concurrently with a request-for-service signal. Consequently, as soon as the memory makes the decision to accept the request, it then commences accepting the address information.

After the complete address is assembled in the memory or responder, the memory control causes the immediate initiation of the memory cycle. At this juncture, ample time usually remains before the data word to be written need be available at the memory module. Accordingly, an acceptance signal is transmitted to the processor after the assembling of the complete address is effected in such memory. Meanwhile, until such time as the processor or requestor communicating with the memory receives the latter acceptance signal, it continues the serial byte-by-byte retransmission of the address. Now, upon its reception of the acceptance signal, the processor transmits a byte-string representing the data word, the latter word however being transmitted only once.

It is readily appreciated from the above that the propagation delays caused by the acceptance signal and the write-data string are substantially completely overlapped with other events and that only the request signal, address string and read-out data string contribute propagation delay to the total effective memory access time as seen by the processor. In addition, the serialization delays of function and write data are substantially completely masked, i.e., overlapped.

Each of the busses respectively associated with each of the $p$ processors or requestors may employ one bidirectional or two unidirectional paths of reach signal category to be transmitted from the requestor to the memory module or responder and back from the responder to the requestor. Such use of two undirectional paths is illustrated conceptually in FIG. 1. In the latter figure, for convenience of explanation, there are shown four requestors, viz., requestors 1–4, each of the requestors suitably being processors, superchannels, and the like. The four requestors communicate with four responders, viz., responders 1–4, each of the responders suitably being memory modules. It is seen in this figure that the bus associated with a given requestor comprises two parts, a set of four transmission lines from the requestor, each of the lines respectively going to one of the responders and a set of four transmission lines entering each requestor, the latter set consisting of a transmission line from each of the responders to the requestor.

Figure 2:
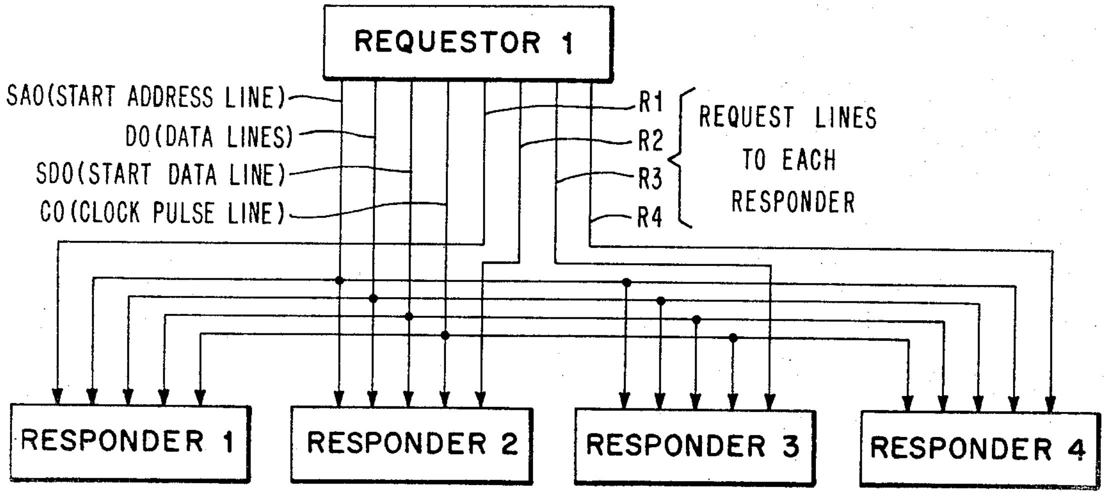
FIG. 2 is a block diagram showing in further detail the arrangement according to the invention of the communication paths emanating from a requestor to the responders in a processing system.

Reference is now made to FIG. 2 wherein there is shown a depiction of the transmissions relationship between a requestor and the four responders relative to the transmission lines PM leaving any given one of the requestors. The PM set comprises:

(1) A set of $m$ request lines R, each of these request lines functioning to signify requests for service from a corresponding one of the $m$ responders.

(2) A start address line SAO from which branches go to all of the $m$ responders, line SAO being operative to mark the first in the string of address bytes.

(3) An $n$-line set of data lines DO from which branches go to all of the $m$ responders, lines DO being employed to transmit $n$-bit bytes of information in parallel ($n$ is equal to or more than 1). The latter $n$ bits may suitably include a parity bit to yield a chosen parity such as odd parity.

(4) A start data line SDO from which branches go to all of the $m$ responders, line SDO being operative to mark the first in the string of data bytes.

(5) A clock-pulse line CO from which branches respectively go to all of the $m$ responders for synchronizing the signal-interpretation circuits in the responder with the signal generating circuits in the requestor. It is to be realized that such clock-pulse line CO would not be required in centrally-clocked and timed systems, or when the code and signal representation permits self-clocking.

Figure 3:
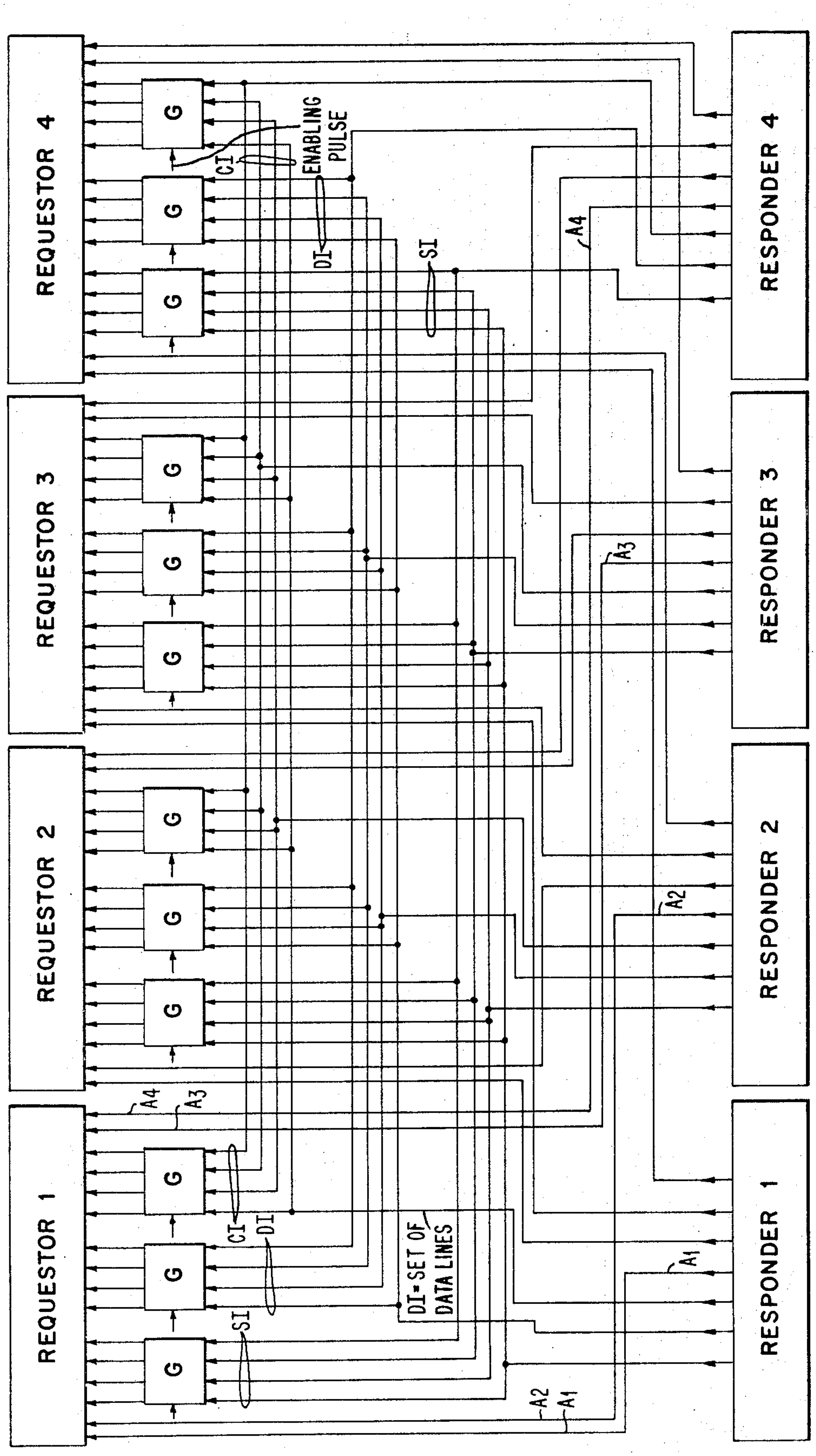
FIG. 3 is a block diagram showing the communication paths between the requestors and the responders of a processing system which emanate from responders and run to the requestors.

Referring to FIG. 3, it is seen therein that the MP-set of transmission lines into any given one of the requestors comprises:

(1) A start line SI from all of the $m$ responders respectively, each of the SI lines having branches which lead to all of the requestors, lines SI functioning to mark the leading byte in the string of information bytes.

(2) A set of $n$ data lines DI from all of the $m$ responders respectively having branches to each of the requestors, lines DI carrying $n$ bit bytes of information with suitable parity, if desired, in parallel.

(3) A clock-pulse line CI from each of the responders respectively, lines CI providing branches to each of the requestors, and serving to synchronize the signal interpretation circuits in the requestor with the signal generation circuits in the responder. Here again, as in the case of the clock pulse lines CO from the requestors, lines CI are not required in centrally-clocked and timed systems, or when the code and signal representation permit self-clocking.

(4) A request accepted line A, one line A from each of the $m$ responders, an A line signalling a requestor when its request has been accepted.

It is to be noted that the R lines (FIG. 2) are the only lines which need be individually driven from the requestors to carry information by space-division whereas the respective SAO, SDO, DO and CO branches can be driven in common, i.e., fan-out of $m$. Correspondingly, it is to be noted in FIG. 3 that the selected respective SI, DI and CI lines are OR-ed together at the requestor by means of the gating circuitry (FIG. 3). Alternatively, if desired, the SAO, SDO, DO and CO lines can be implemented by transmission lines matched at both ends and provided with $m$ taps for connecting the $m$ responder terminals to each one of them, while the requestors are respectively connected to one end of each SI, DI and CI line.

The bussing system disclosed in FIGS. 1–3 suitably employs queueing and gating circuits (not shown in these figures) through which the bus lines connect to the responders.

In considering the operation of the bussing system according to the invention, let it be assumed that a requestor or processor has a word that it has to transmit to a particular memory module or responder. In such situation, it transmits a steady signal along the appropriate request line R to the appropriate responder, where the request is suitably inserted into a queue. Simultaneously, the resquestor sends a string of function and address bytes along the bus to the responder. This transmission is repeated until the acceptance arrives after a delay which, of course, is dependent in part upon the initial size of the queue at the responder at the original time of arrival of the request. To identify the leading or any other byte of the function string, a pulse is provided on an SAO line simultaneously with the first byte of the function-address sequence.

Upon reaching the appropriate point of any memory cycle, the responder unit induces the queueing circuits to accept the next request, such decision to accept being unique to the individual multiprocessor system. The responder, upon making this decision, immediately begins to gate the individual address bytes transmitted by the selected requestor into its address register and the function byte into a control register. The receipt of the signal on the SAO line informs the responder that the concurrently received byte is the most significant of the address bytes (or whichever of the bytes was so identified). The latter information is employed to position the function and address bytes into the responders' registers correctly, such as by a circular shift for example. When the function and address bytes have all been received, even if the first byte accepted by the responder is not the leading byte of the address string, the responder sends the accept pulse signal along the appropriate line A to the requestor that had issued the request. The responder, having positioned the bytes correctly by a circular shift or other suitable technique, immediately begins the read half of the memory cycle using the received address which has been placed into its address register.

When the accept signal is received by the requestor, it commences transmission of the data word along the appropriate data lines DO. The string of data bytes, however, is transmitted to the designated responder only once, the requestor then ceasing transmission and removing its request signal from that line. The leading byte in the data byte string is marked by the transmission of a pulse on line SDO. When the responder unit receives the SDO signal, it begins gating all of the data bytes from the bus from the selected requestor into its data registers. Thus, when the read half of the memory cycle is complete, the memory module can commence the write half of the memory cycle.

When a requestor wishes to fetch data from the responder, there is undergone an identical sequence of operations as herein described. However, all functions of data transmission from the requestor are not necessary. A simple control can transmit the data read from memory to the requestor.

From the foregoing it is to be noted that the main advantage of the arrangement according to the invention is that the requestor sends its request and address information to the responder as soon as the need for a request is perceived. The responder can begin to accept useful address information from the bus as soon as it accepts the request. The complete address is loaded into the responder's, i.e., the memory's address register, in the time required to receive all address bytes. In other words, no matter what the point is in the cycle of transmission, the responder begins to accept address bytes. It is not possible to begin memory access faster by any other serial-by-byte address transmission scheme. The memory cycle can begin before the data is received, which thereby speeds up memory operations. Only one byte width bus is needed for address and data transmissions.

An alternative mode of operation is one in which the address bytes can be accepted sooner if the responder makes its priority decision slightly before the end of the immediately preceding memory cycle. Further, the initiation of data transmission can be speeded up if the responder sends the accept signal in advance of the loading the last address byte into its address register. In such arrangement, the data transmission can be commenced immediately after the transmission of the last address byte needed by the requestor. No redundant address bytes need be sent. It is appreciated that the speedy alternative arrangement is feasible when signal propagation delays can be carefully tuned.

In the event that it is desired to achieve greater economy, it is possible to eliminate the SDO line. With such arrangement, instead of there being sent an SDO signal concurrently with the first data byte, another SAO signal is sent on the SAO line, concurrently with the first data byte. The responder unit, once it has sent the accept pulse, gates all of the succeeding bytes from the bus coming from the selected requestor into its data registers. It overwrites address bytes with data bytes that are later received. When the first parity byte arrives, which may suitably be an all zeroes even parity byte, the responder recognizes that all of the data bytes have been received and loaded into the data register. The most significant of the data bytes is readily identified. This greater economy method enables the saving due to the elimination of one line, i.e., the SDO line; however, it does present the disadvantage in that certain infrequently occurring parity errors can lead to incorrect transmissions of data.

Also, in the inventive arrangement, simplification of control circuitry can be made at the expense of speed. Thus, the arrangement can be designed such that following the accept signal, the requestor completes the entire cycle of address bytes before commencing the data byte transmission. In such arrangement, the responder knows that the first byte that arrives, where the SAO signal should be but actually is not present, is the first data byte. The same effect can be produced if the responder sends the accept pulse as soon as the decision is made to receive from the chosen requestor, and the requestor sends one more complete cycle of address bytes upon receiving the accept signal before transmitting the data bytes.

Figures 4, 4A:
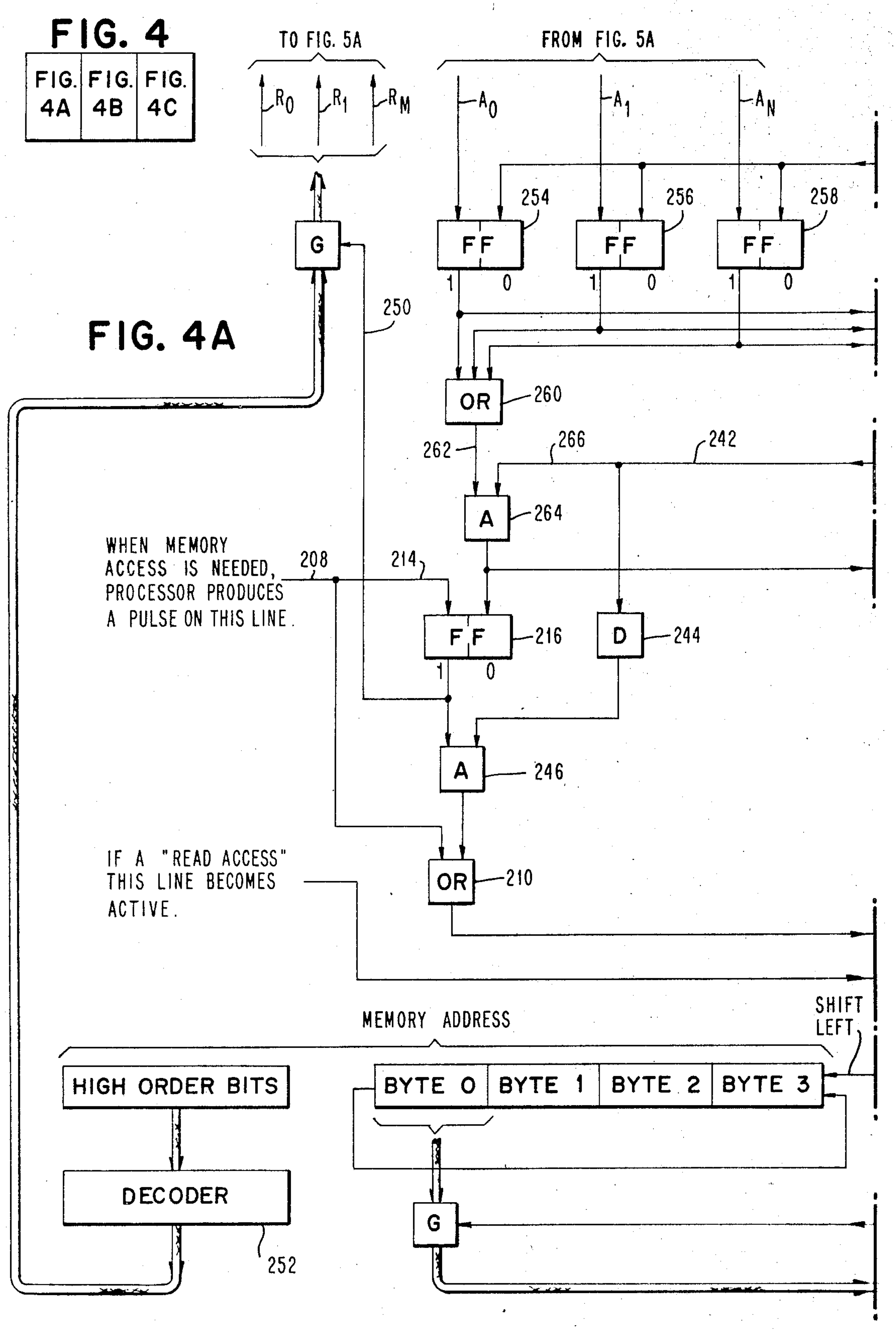
FIGS. 4A–4C, taken together as in FIG. 4, comprise a logical diagram of an embodiment of that control portion of the inventive arrangement associated with each requestor in the processing system.
Figure 4B:
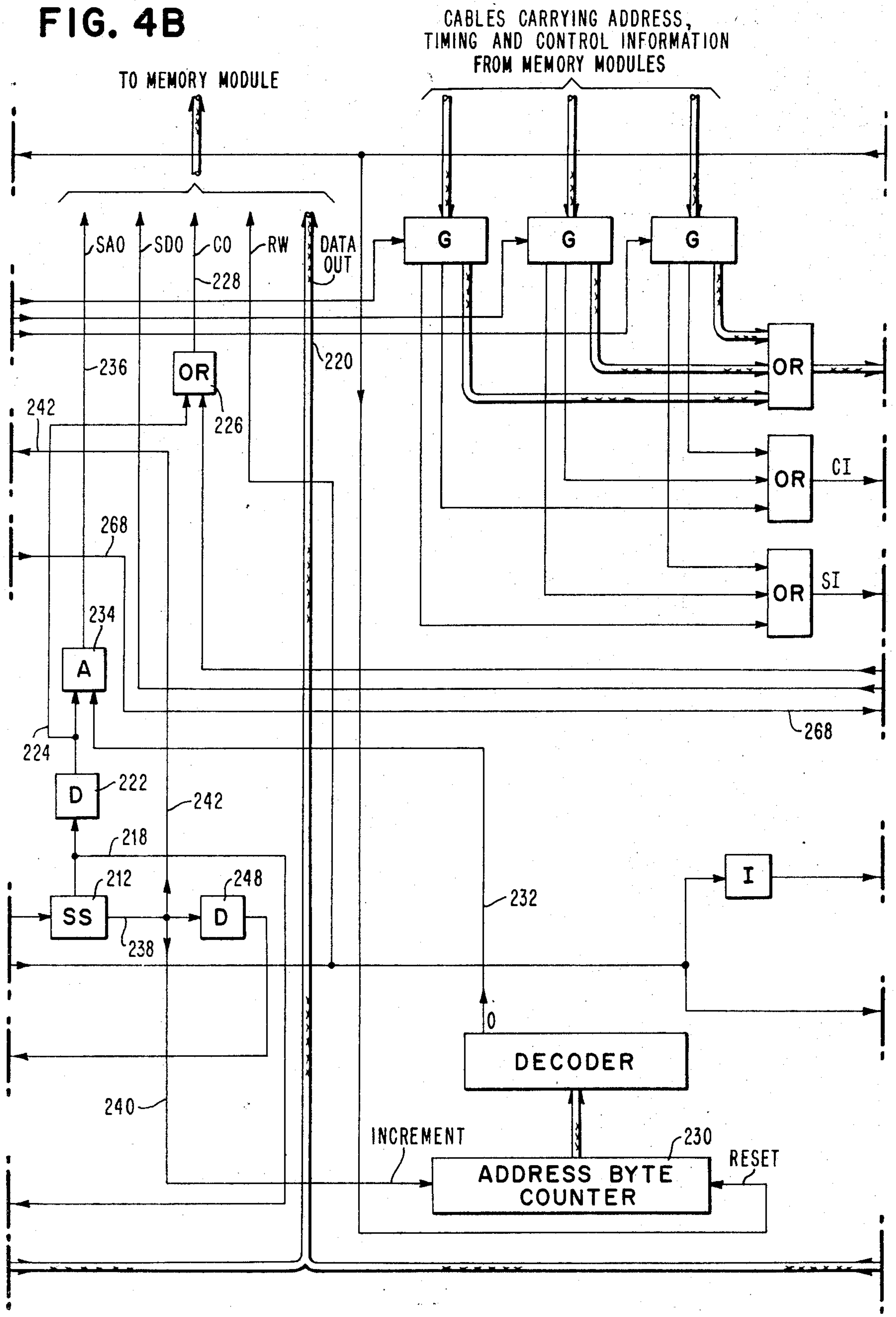
Figure 4C:
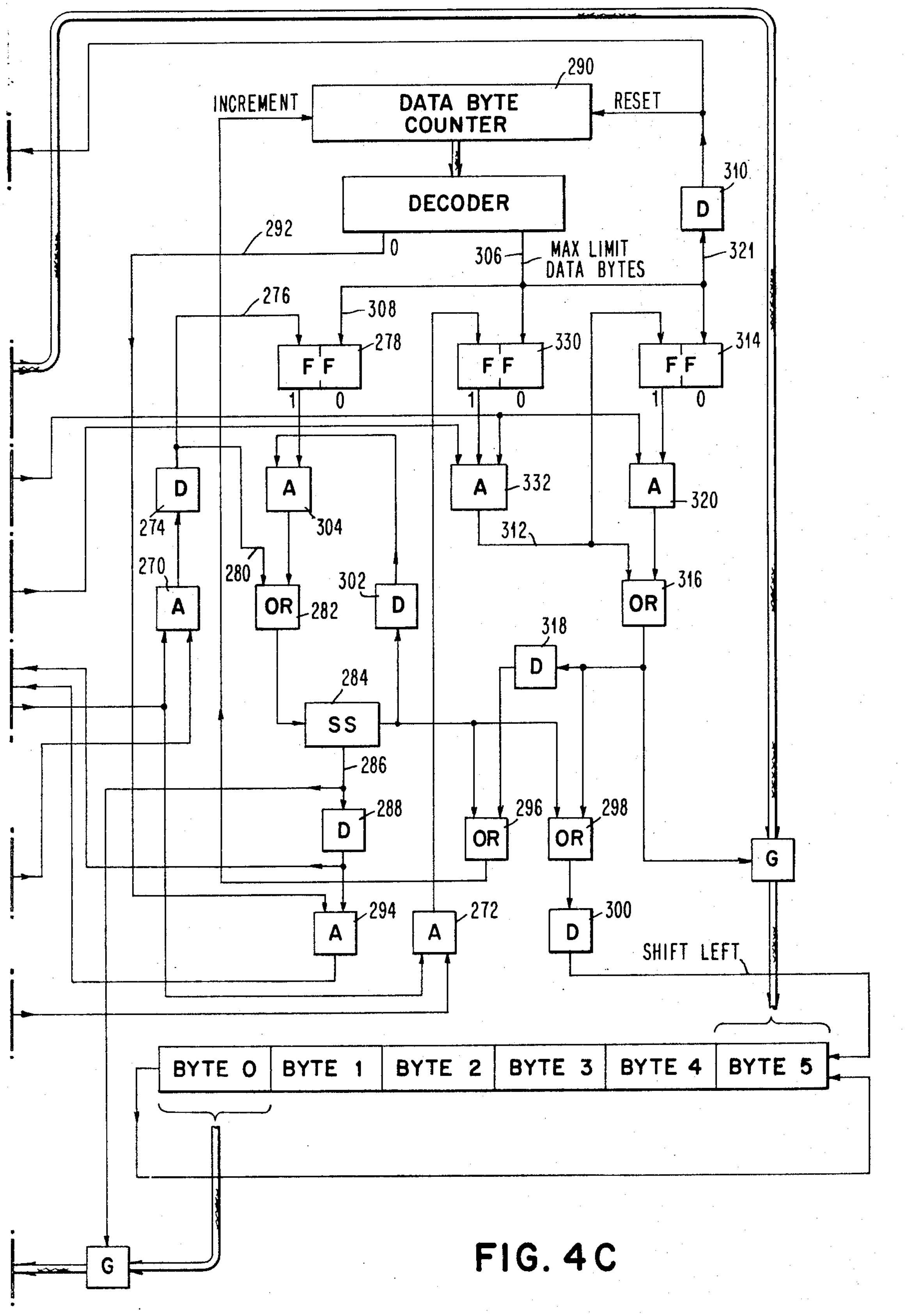

Reference is now made to FIGS. 4A–4C, taken together as in FIG. 4, wherein there is shown the pertinent circuitry in a requestor such as a processor relative to the inventive arrangement. In these figures, it is assumed that when a processor requires a responder access, i.e., a memory access, a suitable pulse is produced on line 208 by circuit structure not shown, such pulse being the pulse sent along the appropriate request line R, as shown in FIG. 2. This pulse passes through an OR circuit 210 to switch a monostable multivibrator 212 to its astable state. A branch circuit extends from line 208 through a line 214 to set a flip-flop 216 to its "1" state. When monostable multivibrator 212 is switched to its astable state, a line 218 becomes active to thereby enable the gating of an address byte to a bus 220 legended "data out." A delay circuit 222 is operative to produce a pulse on a line 224 which extends through an OR circuit 226 to produce a clock pulse CO on a line 228.

At the beginning of operations, an address byte counter 230 is at zero and consequently a line 232 is active in order to enable a gate 234. The output of delay circuit 222 thus passes through an AND circuit 234 and is applied to a line 236 as the SAO (start address out) pulse, line 236 being the SAO line. Delay circuit 222 functions to insure that data is on the bus at the same time or slightly before clock pulses are transmitted.

When monostable multivibrator 212 reverts to its stable state, i.e., goes "off," a pulse is produced on a line 238 which extends through a line 240 to increment address byte counter 230. The same pulse on line 238 is transmitted along a line 242, through a delay circuit 244, an AND circuit 246 and OR circuit 210 to again switch monostable multivibrator 212 to its astable state. The pulse on line 238 is also operative through a delay circuit 248 to shift the address byte register to the left. It is to be noted that, when flip-flop 216 (FIG. 4A) is set to its "1" state, a line 250 is activated whereby there is enabled the gating of the output of a decoder 252 to one of the request lines such as $R_0$, $R_1$ or $R_m$.

With the arrangement as described hereinabove, address bytes are successively placed upon the outgoing bus 220 along with an accompanying clock pulse CO (clock out). Whenever the address byte counter 230 is at "0," an SAO pulse is also produced. In the example shown, i.e., where there are four address bytes, the address byte counter would count from 00 to 11 and then revert back to the 00 setting.

When an "accept" signal is received from a responder, i.e., a memory module, one of the flip-flops 254, 256 or 258 (FIG. 4A) is set to its "1" state. This causes an OR circuit 260 (FIG. 4A) to produce an output on a line 262 to enable an AND circuit 264. Under these conditions, when monostable multivibrator 212 reverts to its stable state, the pulse on line 242 branches through a line 266 to pass through an AND circuit 264 whereby it resets flip-flop 216 to its "0" state. This same pulse on line 266 appears on a line 268 (FIG. 4A) where it is applied to an AND circuit 270 and an AND circuit 272. If the responder, i.e., memory access, is a "write" access, AND circuit 270 is enabled. If the memory access is a "read" access, then AND circuit 272 is enabled. There first follows hereinbelow the description of the "write" access operation.

The output of AND circuit 270 is passed through a suitable delay circuit 274 to a line 276 whereby it is operative to set a flip-flop 278 to its "1" state. A branch circuit extends along line 280 and through an OR circuit 282 to switch a monostable multivibrator 284 to its astable state. The astable state output of multivibrator 284 is operative through a line 286 to gate the first byte of the data to the data out bus 220. It is also effective via a delay circuit 288 (FIG. 4C) to transmit a CO pulse. At the start of the transmission of data, a data byte counter 290 will be in the "0" state and a line 292 will be active in order to enable a gate 294. The output of delay circuit 288 thus produces an SDO (start data out) pulse through gate 294.

When monostable multivibrator 284 reverts to its stable state, it produces a pulse which increments data byte counter 290 through an OR circuit 296. The latter pulse is also operative through an OR circuit 298 and a delay circuit 300 (FIG. 4C) to shift the data byte register to the left. Such pulse is also effective through a delay circuit 302, and AND circuit 304 and OR circuit 282 to again switch monostable multivibrator 284 to its astable state. With this arrangement, data bytes are placed in succession on data out bus 220 along with the accompanying CO pulse. When counter 290 reaches the maximum limit for data bytes, a line 306 becomes active. This active state of line 306 extends along the line 308 to reset flip-flop 278 to its "0" state. Thereby, AND circuit 304 is disabled and transmission of data bytes is halted. Thus, there terminates the "write" access operation. A delay circuit 310 (FIG. 4C) is now effective to reset the various flip-flops and counters which have participated in the "write" access operation. There now follows a description of the "read" access operation.

In a "read" access operation, AND circuit 272 is enabled to set a flip-flop 330 to its "1" state. Consequently, an AND circuit 332 produces an output on line 312 when the first SI pulse appears along with its accompanying CI pulse. The output appearing on line 312 sets a flip-flop 314 to its "1" state and is also effective through an OR circuit 316 (FIG. 4C) to gate the incoming bus to the data register. The output of OR circuit 316, through a delay circuit 318 and OR circuit 296, increments data byte counter 290. The output of OR circuit 316, through OR circuit 298 and delay circuit 300, shifts the contents of the data register one byte to the left. It is to be noted that, when flip-flop 314 is set to its "1" state, an AND circuit 321 is enabled; thereby, succeeding CI pulses are transmitted through an AND circuit 321 to OR circuit 316. The latter operation is repeated until data byte counter 290 attains its maximum capacity for data bytes. When such capacity is attained, line 306 is activated, the active state of line 306 extending through a line 320 to reset flip-flops 314 and 330 to their "0" states. At this point, the "read" access operation terminates. Delay unit 310 produces an output at this juncture in order to perform the necessary resets.

Figure 5A:
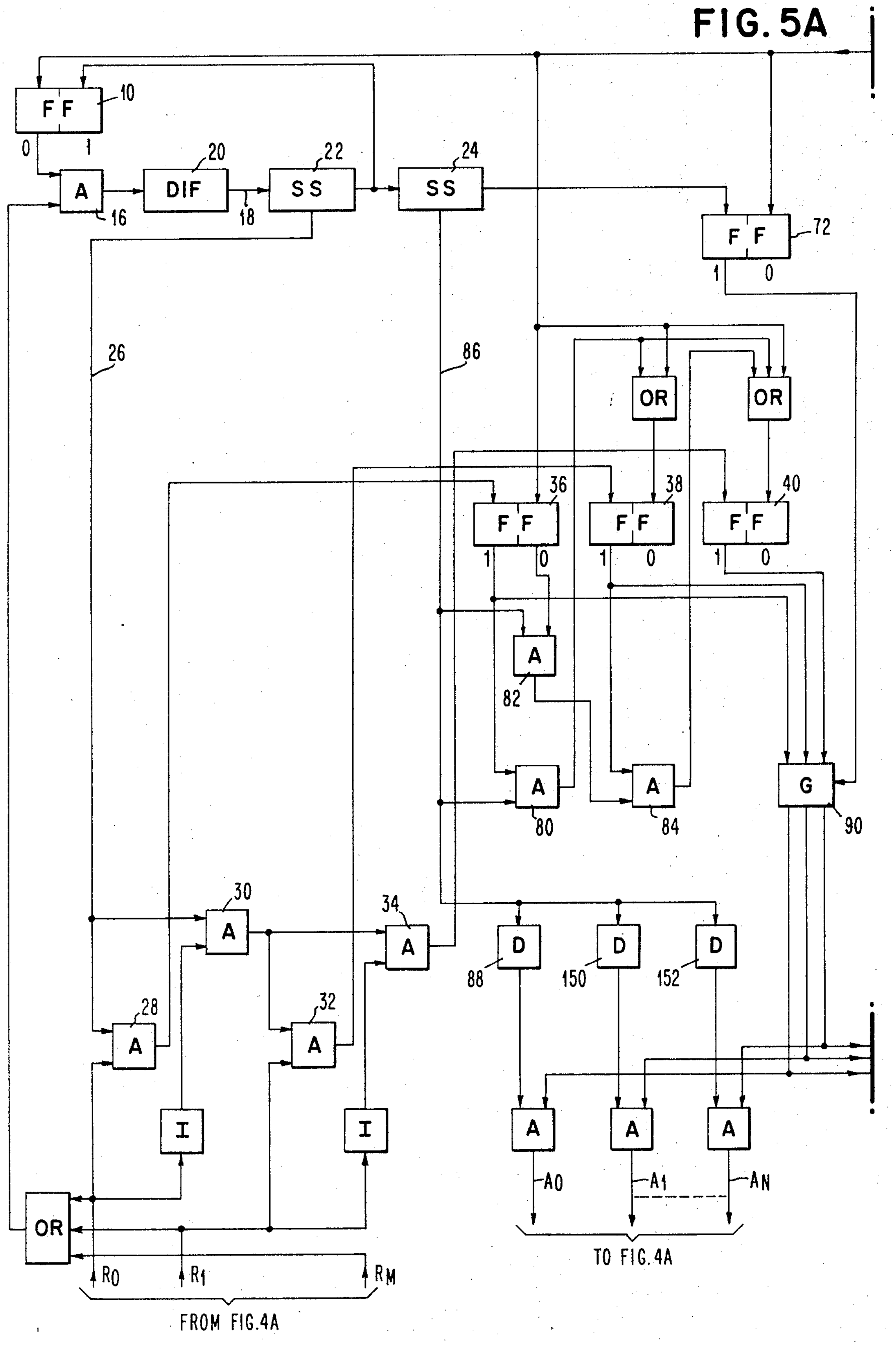
FIGS. 5A–5D, taken together as in FIG. 5, is a logical diagram of an embodiment of that portion of the inventive arrangement associated with each responder in the system.
Figure 5B:
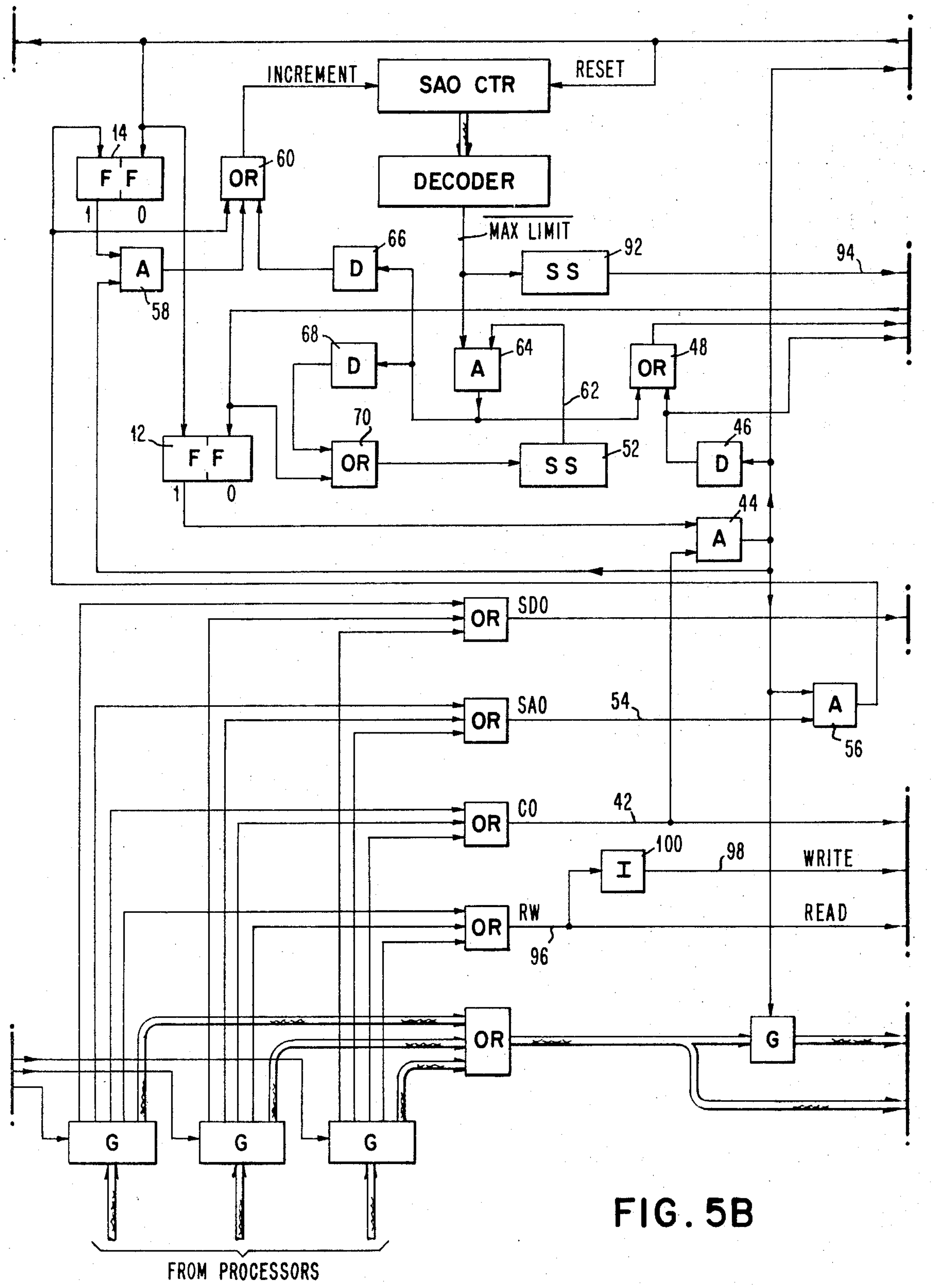
Figure 5C:
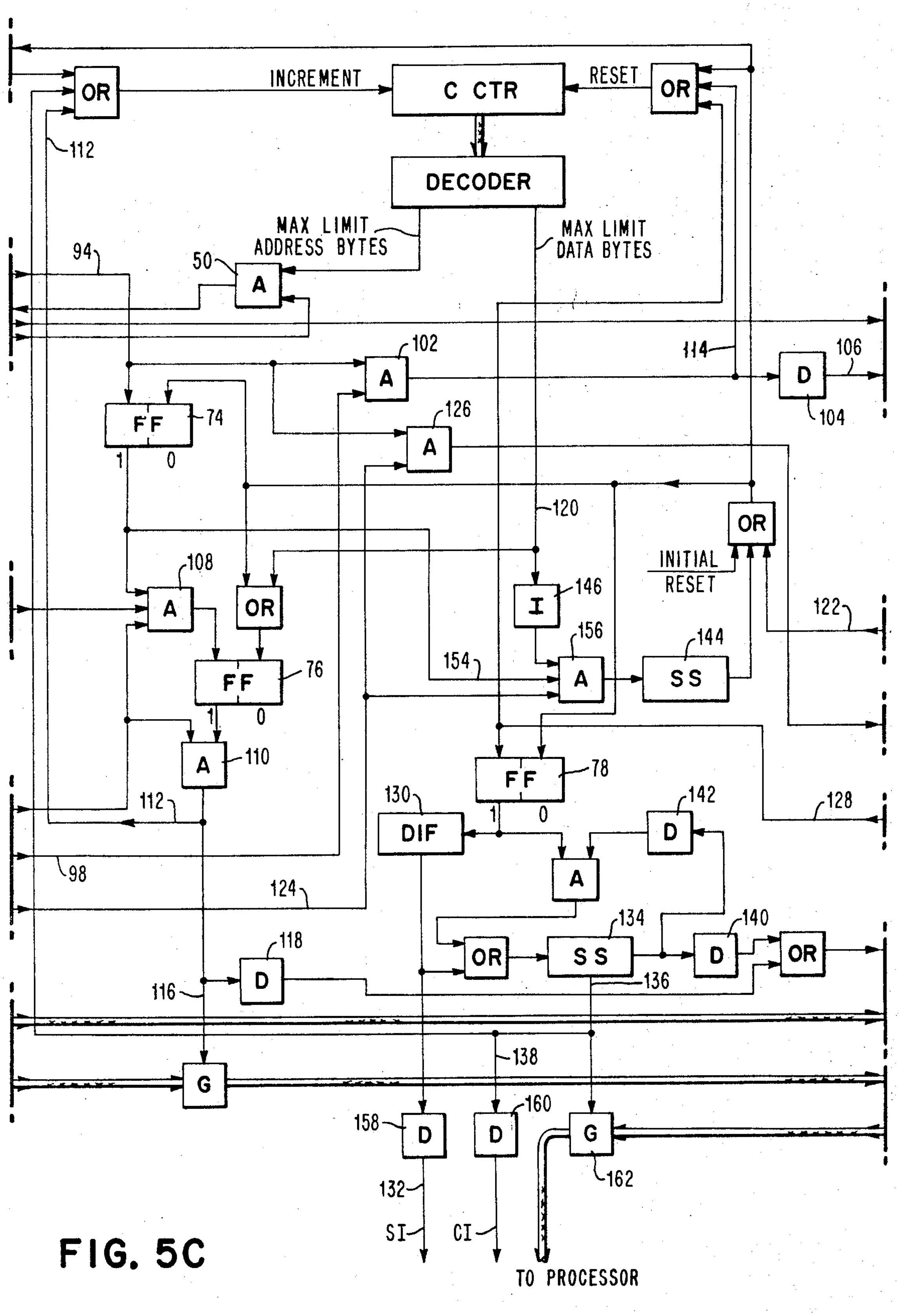
Figure 5:
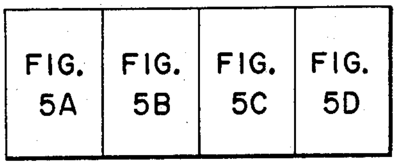
Figure 5D:
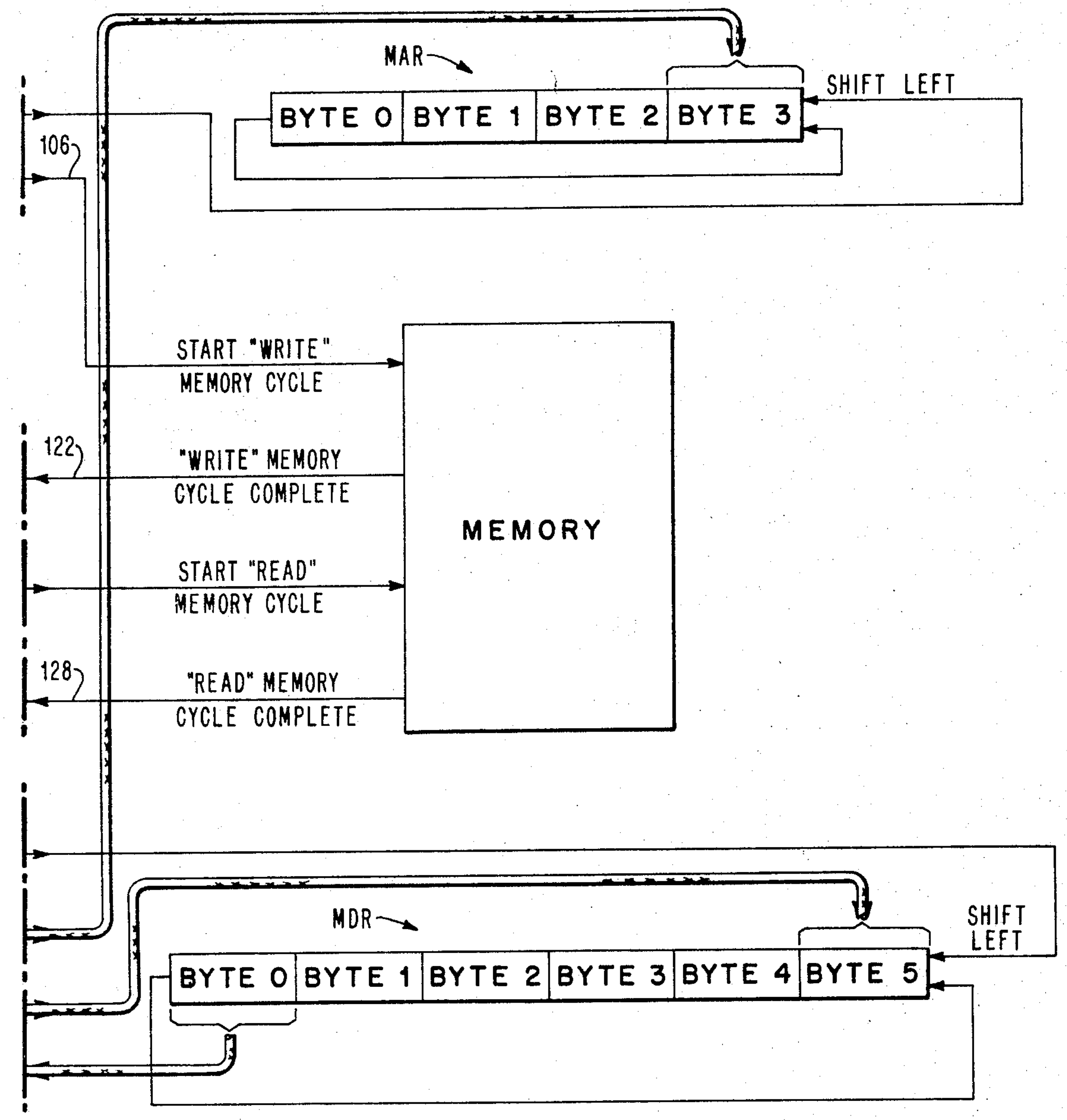

Reference is now made to FIGS. 5A–5D, taken together as in FIG. 5, for a description of the control in the responder, i.e., the memory module constructed in accordance with the principles of the invention.

Initially, when the arrangement is placed into operation or when a memory module completes its read or store operation, the following flip-flops and counters are reset to their zero states, viz., flip-flops 10, 14, 36, 38, 40, 72, 74, 76 and 78. Flip-flop 12 is set to its "1" state. The C counter is reset to its "0" state and the SAO counter is also reset to its "0" state.

When a memory module is available, its flip-flop 10 is set to the "0" state. If one or more of access lines $R_0 \ldots R_m$ are or become active, an AND circuit 16 (FIG. 5A) produces an output and a single pulse appears on a line 18 which is the output of a differentiating circuit 20. The pulse on line 18 switches a monostable multivibrator 22 to its astable state to thereby activate a line 26, the active state of line 26 being empolyed to test the priority circuit arranged with the request lines $R_0$ to $R_m$. The latter priority circuit includes AND circuits 28, 30, 32 and 34 (FIG. 5A). Thus, for example, if access line $R_0$ is active, regardless of the condition of lines $R_1$ to $R_m$, a flip-flop 36 is set to its "1" state. On the other hand, if access line $R_0$ is not active but line $R_1$ is active, for example, a flip-flop 38 is set to its "1" state On the other hand, if access line $R_0$ is not active but line $R_1$ is active, for example, a flip-flop 38 is set to its "1" state regardless of the condition of line $R_m$. If both access line $R_0$ and $R_1$ are inactive, then access line $R_m$ has to be active and a flip-flop 40 is set to its "1" state.

When monostable multivibrator 22 reverts to its stable state, a pulse is produced therefrom which is employed to set flip-flop 10 to its "1" state and also to switch a monostable multivibrator 24 (FIG. 5A) to its astable state. Since the possibility exists that the pulse appearing on line 26 may enable both AND circuits 28 and 30, such occurrence being possible if access line $R_1$ has been first activated to satisfy the conditions required to enable AND circuit 16, and then line $R_0$ were to become active just as the pulse on line 26 appeared, the following described circuit is provided to prevent such possibility. This last-named circuit employs the pulse appearing on a line 86 which occurs when monostable multivibrator 24 is in its astable state. It is to be noted that such circuit finds the left-most one of flip-flops 36, 38 and 40 which is in its "1" state. When such flip-flop is found, all of the flip-flops to the right thereof are reset to their "0" states. In other words, if flip-flop 40 is the left-most flip-flop that is found by this prevention circuit, there is no necessity to reset any flip-flop since there are no flip-flops to the right of flip-flop 40.

When monostable multivibrator 24 reverts to its stable state, a flip-flop 72 (FIG. 5A) is set to its "1" state. This causes a gate 90 to be enabled and the appropriate gating is established between the memory module and the particular processor which initiated the request therefor. The output of one of the delay circuits 88, 150 or 152 is employed to send back the "accept" signal on the proper "accept" line. The three delay circuits 88, 150 and 152 are provided since the paths to the various processors may be of different lengths.

The first CO pulse appears on a line 42 and extends through an AND circuit 44 since flip-flop 12 is in its "1" state. The occurrence of the first CO pulse causes an address byte to be gated into the right-hand stage of the MAR (memory address register, FIG. 5D) and also causes the C counter (FIG. 5C) to be incremented. The CO pulse is delayed by a delay unit 46 and then passes through an OR circuit 48 to shift the contents of the MAR (FIG. 5D) register one byte to the left. The CO pulse, as delayed by delay unit 46, is also applied to an AND circuit 50 in order to test the C counter. After four CO pulses, AND circuit 50 produces an output which resets flip-flop 12 to its "0" state to thereby inhibit AND circuit 44. The output of AND circuit 50 also switches a monostable multivibrator 52 to its astable state. The operations respectively of flip-flop 14 and monostable multivibrator 52 are described immediately hereinbelow.

Relative to the operation of flip-flop 14, it is to be noted that originally it is in its "0" state under which condition no counts can be entered into the SAO counter (FIG. 5B). However, at some point during the immediately preceding last four CO pulses, the SAO pulse had arrived. This altter SAO pulse had been clocked through an AND circuit 56 by a CO pulse. Thereby, the output of AND circuit 56 had been effective to set flip-flop 14 to its "1" state and to increment the SAO counter. The arrival of the SAO pulse could have coincided with the occurrence of the first, second, third or fourth CO pulse. If the SAO pulse had arrived during the occurrence of the first, second or third CO pulses, then a succeeding CO pulse thereafter would be effective through an AND circuit 58 and an OR circuit 60 to increment the SAO counter.

Relative to the operation of monostable multivibrator 52, it is recalled that the fourth CO pulse had switched multivibrator 52 to its astable state whereby a pulse is produced on line 62 which tests the SAO counter. If the SAO counter being tested is not at its "max limit" state, an AND circuit 64 (FIG. 5B) produces an output which passes through an OR circuit 48 and then causes the contents of the MAR register to be shifted one byte to the left. When monostable multivibrator 52 reverts to its stable state, delay circuit 66 produces a pulse which increments the SAO counter. When the latter occurs, a delay circuit 68 produces a pulse which passes through an OR circuit 70 to switch monostable multivibrator 52 to its astable state. The sequence will continue until the SAO counter reaches its "max limit" state at which time AND circuit 64 is inhibited.

A monostable multivibrator 92 (FIG. 5B) is maintained in its astable state as long as the SAO counter is not at its "max limit" state. Slightly after the SAO counter reaches such "max limit" state, monostable multivibrator 92 reverts to its stable state to produce a pulse on a line 94. A line 96 is provided in order that the memory module may distinguish between a "read" access and a "write" access operation. Thus, if line 96 (FIG. 5B) is active, it signifies that the required operation is a "read" access. If line 96 is inactive, it signifies that the operation is a "write" access. When line 96 is inactive to indicate a "write" access, because of the presence of inverter 100, a line 98 will be active during a "write" access operation and, consequently, an AND circuit 102 will be enabled. Thereby, the pulse on line 94 is effective to set flip-flop 74 to its "1" state, and passing through AND circuit 102 and a delay circuit 104 to produce a pulse on line 106 which is operative to initiate the write memory cycle. The memory cycle can be started before the MDR (memory data register, FIG. 5D) is loaded since the slot in the memory in which the new data is to be written must first be cleared to zeros. Delay circuit 104 functions to introduce an appropriate amount of delay in order that the memory cycle will not be started too soon, i.e., the new contents of the MDR register must be completely loaded by the time that the memory requires information. The setting of flip-flop 74 to its "1" state enables AND circuit 108 whereby the SDO pulse can next be recognized. The SDO pulse is clocked through AND circuit 108 by a CO pulse and is employed to set flip-flop 76 to its "1" state. The AND circuit 110 now has an output for each CO pulse. It is to be noted that the C counter had been reset to the "0" state when monostable multivibrator 92 reverted to its stable state through the action of the pulse on line 114. The CO pulses are thereby effective on line 112 to increment the C counter. The CO pulses on line 116 are operative to gate data bytes into the rightmost stage of the MDR register. Each CO pulse is delayed by a delay unit 118 (FIG. 5C) which shifts the contents of MDR register one byte to the left. Such shifting continues until the C counter reaches its max limit for data bytes. At this juncture, a line 120 becomes active to reset flip-flop 76 to its "0" state thereby inhibiting AND circuit 110. At this time, the MDR register is fully loaded and the memory completes its write cycle. When the latter cycle is completed, a pulse appears on a line 122, such pulse resetting the various flip-flops and counters to their zero states so that the memory is again available.

If the memory access operation had been a "read" access, then a line 124 (FIG. 5C) would have been active to enable a gate 126. In such operation, the pulse on line 94 now passes through an AND circuit 126 to initiate a read memory cycle. Such events are necessary in order to load the MDR register with information which has to be sent back to the processor. When the read memory cycle is complete, a pulse appears on a line 128 to set flip-flop 78 to its "1" state. The pulse on line 128 also resets the C counter (FIG. 5C) to zero. When flip-flop 78 is set to its "1" state, the differentiating circuit 130 (FIG. 5C) produces a pulse on a line 132, the latter pulse being the SI (start) pulse, which has to be sent back to the processor. Simultaneously, a monostable multivibrator 134 is switched to its astable state in order to produce a pulse on line 136, the latter pulse branching to line 138 in order to produce CI pulse which goes back to the processor. The delay circuits 158 and 160 (FIG. 5C) are provided so that the SDI and CI pulses leave the memory module at exactly the same time as the output of a gate 162.

Each CI pulse produced on line 136 functions to increment the C counter and to gate the left-hand byte of the contents of the MDR register to the cable which goes back to the processor. When monostable multivibrator 134 reverts to its stable state, a pulse is produced which is delayed by the delay circuit 140 (FIG. 5C) which is employed to shift the MDR register one position to the left. Another delay circuit 142 (FIG. 5C) is employed to provide a pulse to reswitch monostable multivibrator 134 again to its astable state. A monostable multivibrator 144 (FIG. 5C) is maintained in its astable state as long as the C counter is not at its max limit for data bytes. When the C counter reaches such max limit for data bytes, an output is no longer produced from an inverter 146 and monostable multivibrator 144 reverts to its stable state. Such action results in the operations being terminated with the appropriate counters and flip-flops being reset to their "0" states, as described hereinabove. It is to be noted that a line 154 (FIG. 5C) is provided in order that AND circuit 156 is enabled only upon a data operation. The max limit for data bytes might be less than the max limit for address bytes and, if this were the case, line 120 would become active during an address byte operation to cause undesirable results.

Figure 6:
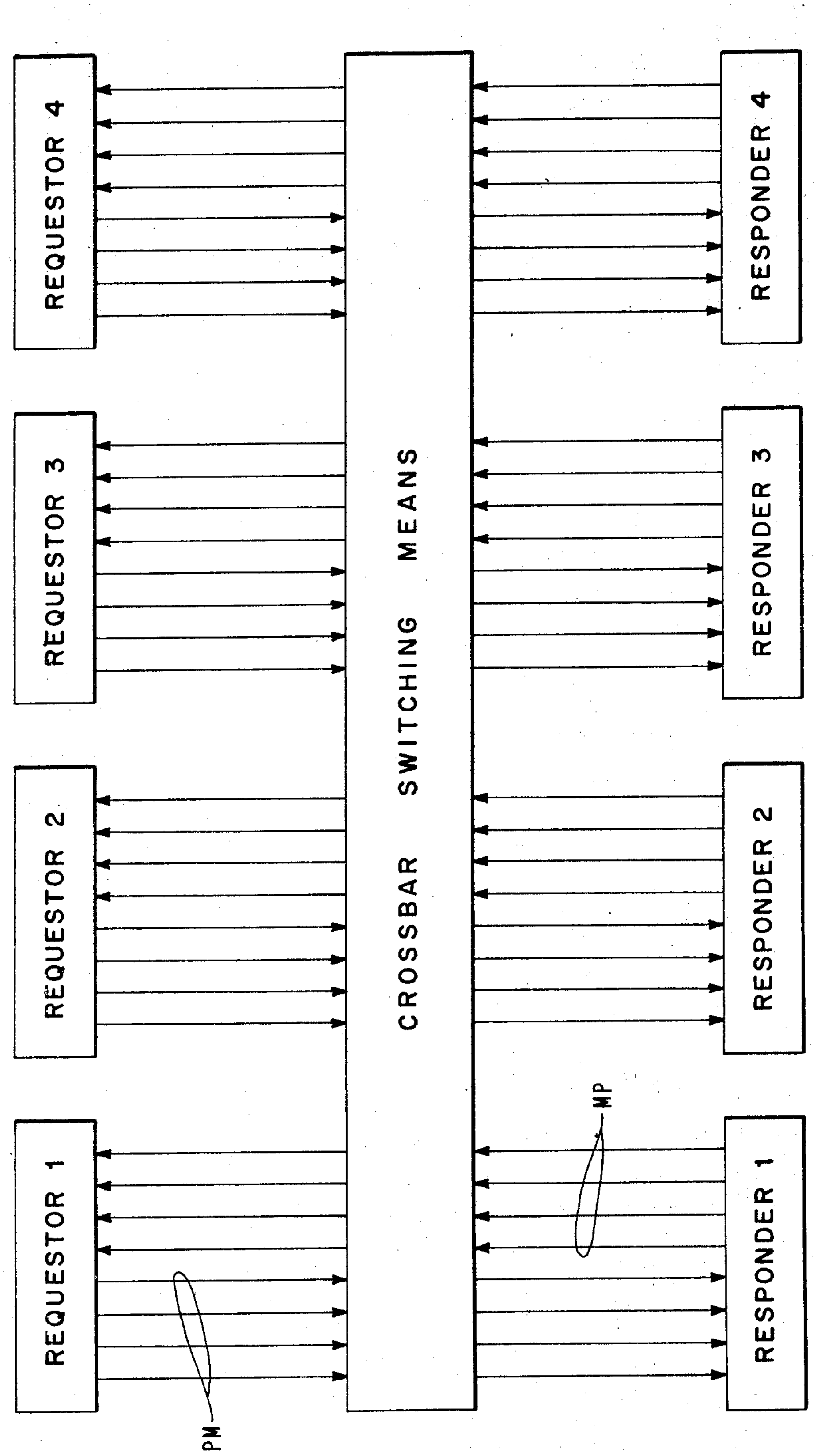
FIG. 6 is a diagram similar to that shown in FIG. 1 and which further includes crossbar switching means.

Within the contemplation of the invention, it is to be realized that rather than having the requestors respectively connected to the responders and vice versa as shown in FIGS. 1, 2 and 3, the respective lines, i.e., the cables from each of the requestors can all be connected to a crossbar switch stage or to crossbar switch stages. From the latter stage or stages, the appropriate lines can go to the responders. Such arrangement is illustrated in FIG. 6. The crossbar switching stage means shown in FIG. 6 can suitably comprise a single stage, a plurality of serially arranged stages, etc., and may contain some of the controls which are necessary for the generating and the sending of the acceptance of the serial address transmission to the requestors. Since crossbar switching arrangements are well known in the art, no further detailed description of the crossbar switching means stage shown in FIG. 6 is deemed necessary.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A bussing arrangement for a processing system which includes a plurality of information requestors and a plurality of responders wherein each of said responders comprise selection circuit means, said bussing arrangement comprising:

- a separate bus for connecting each of said requestors to each of said selection circuits of all of said responders;
- means for effecting serial transmission of addresses, operation commands, and data words over said busses;
- means for repetitively continually presenting a given address specifying an operation command request to a selected one of said responders from a chosen one of said requestors on the bus interconnecting said last-named requestor and responder, said responder commencing the acceptance of said request concurrently with a decision to accept said request irrespective of the existing point of said request in the transmission cycle of serial transmission;
- means responsive to the completion of the acceptance of said request by said responder for producing an acceptance signal which is transmitted from said responder to said requestor on said interconnecting bus; and
- means operative upon the reception of said requestor of said acceptance signal for causing the single transmission of a data word from said requestor to said responder over said bus.

2. A bussing arrangement for a processing system which includes processing means and a plurality of responders comprising:

- first means respectively interconnecting said processing means with each of said responders, said interconnecting first means comprising,
  - request line means from said processing means to said responders for providing a request for service by said processing means from a given one of said responders,
  - start address line means from said processing means to said responders for denoting the first in a string of address signals,
  - data line means from said processing means to each of said responders for transmitting to each of said responders data information signals,
  - start data line means from said processing means to said responders for denoting the first in a string of data signals;
- second means interconnecting said responders with said processing means comprising,
  - start line means from said responders to said processing mean for denoting the leading signals in a string of information signals,
  - data line means from said responders to said processing means, and
  - request accepting line means from said responders for providing respective signals from said responders to said processing means which indicate the acceptances of requests;
- control means included in said processing means for continually and repetitively presenting a string of address signals and said request for service on said first means;
- control means contained within each of said responders, each of said control means comprising means for causing said responders to decide to respectively accept said string of address signals and to commence receiving signals irrespective of the point of the transmission cycle of said string, means for assembling signals into an address, said start address line means indicating the first signal in said address, and means for causing said responders to send acceptance signals to said processing means; and
- means contained in said processing means control means which, in response to the receipt of an acceptance signal, causes the transmitting of a string of data signals to said responders.

3. A bussing arrangement as defined in claim 2 wherein said first means further includes clock-pulse line means from said processing means with said responders for synchronizing said processing means with said responders and wherein said second means further includes clock-pulse line means from said responders to said processing means for synchronizing said responders with said processing means.

4. A bussing arrangement for a processing system which includes a plurality of information requestors and a plurality of information responders comprising:

- a plurality of first means interconnecting each of said requestors with each of said responders, each of said first means comprising,
  - request line means for a requestor to each of said responders for signifying requests for service from one of said responders respectively,
  - start address line means from a requestor to each of said responders for indicating the first in a string of address bytes,
  - data line means from a requestor to each of said responders for transmitting bytes of information, and
  - start data line means from a requestor to each of said responders for indicating the first byte in a date byte string;
- a plurality of second means terminating at each of said requestors, each of said second means comprising,
  - start line means to a requestor from each of said responders which indicates the first byte in an information byte string,
  - data line means to a requestor from each of said responders for carrying bytes of information, and
  - request acceptance line means to a requestor from each of said responders for signalling a requestor that its request for service has been accepted;
- first control means contained within each of said requestors for causing the continuous and repetitive presenting of a string of address bytes and a request for service signal on said first means;
- second control means contained within each of said responders, each of said second control means comprising means for causing said responders to decide respectively to accept said string of address bytes and to commence receiving said bytes irrespective of the point of the transmission cycle of said string, means for assembling said address bytes into an address, said start address line means indicating the first signal in said address, and means for causing said responders to send acceptance signals to said requestors;
- and further means contained in each of said requestors which, in response to the receipt of an acceptance signal, causes the transmitting, only once, of a string of data bytes to said responders.

5. A bussing arrangement as defined in claim 4 wherein each of said first means further includes clock-pulse line means from a requestor to each of said responders for synchronizing said requestors with said responders, and wherein said second means further includes clock-pulse line means to each of said requestors from said responders for synchronizing said responders with said requestors.

6. A bussing arrangement for a processing system which includes a plurality of information requestors and a plurality of responders, each of said responders comprising selection circuit means, said bussing arrangement comprising:

crossbar switching means;

respective first busses for connecting each of said requestors to each of said selection circuits of all of said responders through said crossbar switching means;

means for effecting serial transmission of addresses, operation commands, and data words over said busses;

respective second busses for connecting each of said responders to each of said requestors through said crossbar switching means;

means for repetitively continually presenting a given address specifying an operation command request to a selected one of said responders from a chosen one of said requestors on the first bus interconnecting said last-named requestor and responder, irrespective of existing point of said request in the transmission cycle of said serial transmission, said responder commencing the acceptance of said request concurrently with a decision to accept said request;

means responsive to the completion of the acceptance of said request by said responder for producing an acceptance signal which is transmitted from said responder to said requestor through said crossbar switching means on the second bus interconnecting said responder and said requestor; and means operative upon the reception by said requestor of said acceptance signal for causing the single transmission of a data word from said requestor to said responder through said crossbar switching means on the first bus interconnecting said last-named requestor and responder.

7. A bussing arrangement as defined in claim 6 wherein said crossbar switching means includes controls for the generating and the sending of said acceptance signals to said responders.

References Cited

UNITED STATES PATENTS

| | | | |
|---|---|---|---|
| 3,061,192 | 10/1962 | Terzian | 340—172.5 |
| 3,226,692 | 12/1965 | Fuller et al. | 340—172.5 |
| 3,242,467 | 3/1966 | Lamy | 340—172.5 |
| 3,274,554 | 9/1966 | Hopper et al. | 340—172.5 |
| 3,323,109 | 5/1967 | Hecht et al. | 340—172.5 |
| 3,344,401 | 9/1967 | MacDonald et al. | 340—172.5 |
| 3,440,616 | 4/1969 | Aranyi et al. | 340—172.5 |

PAUL J. HENON, Primary Examiner

H. E. SPRINGBORN, Assistant Examiner